(12) United States Patent
Trübner et al.

(10) Patent No.: US 10,343,647 B2
(45) Date of Patent: Jul. 9, 2019

(54) BELT RETRACTOR WITH TWO-PART TENSIONING DRIVE WHEEL

(71) Applicant: Autoliv Development AB, Vårgårda (SE)

(72) Inventors: Claudia Trübner, Brietlingen (DE); Frank Wulff, Horst (DE); Juri Kraus, Hamburg (DE); Karsten Schubel, Neritz (DE); Thomas Kubbe, Kaltenkirchen (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 81 days.

(21) Appl. No.: 15/514,832

(22) PCT Filed: Sep. 28, 2015

(86) PCT No.: PCT/EP2015/072220
§ 371 (c)(1),
(2) Date: Jun. 22, 2017

(87) PCT Pub. No.: WO2016/050675
PCT Pub. Date: Apr. 7, 2016

(65) Prior Publication Data
US 2017/0313279 A1    Nov. 2, 2017

(30) Foreign Application Priority Data

Sep. 29, 2014   (DE) ......................... 10 2014 114 140

(51) Int. Cl.
*B60R 22/46*      (2006.01)
*B60R 22/28*      (2006.01)

(52) U.S. Cl.
CPC ...... *B60R 22/4671* (2013.01); *B60R 22/4628* (2013.01); *B60R 2022/286* (2013.01); *B60R 2022/4642* (2013.01)

(58) Field of Classification Search
CPC ............ B60R 22/4671; B60R 22/4628; B60R 2022/286; B60R 2022/4642
See application file for complete search history.

(56) References Cited

U.S. PATENT DOCUMENTS 5,601,251 A * 2/1997 Hishon ................. B60R 22/415
                                                  242/382.2
5,881,962 A * 3/1999 Schmidt ............. B60R 22/4628
                                                  242/374

(Continued)

FOREIGN PATENT DOCUMENTS

DE          195 12 660 A1   10/1995
DE     10 2008 059 386 B3    7/2010

(Continued)

OTHER PUBLICATIONS

Truebner et al, Belt Tensioner for a Seatbelt Retractor, Apr. 3, 2014, EPO, WO 2014/048522 A1, Machine Translation of Description (Year: 2014).*

(Continued)

*Primary Examiner* — James A English
(74) *Attorney, Agent, or Firm* — Brinks Gilson & Lione

(57) ABSTRACT

A belt retractor having a belt shaft having a shaft body, a profile head and a torsion bar, wherein the torsion bar arranged in the shaft body is connected on one end to the shaft body and on a second end to the profile head, and the profile head can be securely attached to the vehicle, and having a belt pretensioner, wherein a pretensioner drive wheel of the belt pretensioner is directly connected in a rotationally fixed manner to the profile head of the belt shaft, and mass bodies can be engaged with the pretensioner drive wheel so as to transmit force to drive the belt shaft in winding direction. The pretensioner drive wheel (16) is configured by means of two parts, the profile head (1) of the belt shaft and a push-on ring (2) that is pushed onto the (Continued)

profile head (1) and is positively and non-positively connected thereto, wherein respectively mutually opposite dome-shaped partial receiving socket segments (3), which form together receiving sockets for the mass bodies, are formed on the profile head (1) and on the push-on ring (2).

6 Claims, 3 Drawing Sheets

(56) References Cited

U.S. PATENT DOCUMENTS

| | | | |
|---|---|---|---|
| 6,419,176 B1* | 7/2002 | Mizuno | B60R 22/4628 |
| | | | 242/374 |
| 7,429,012 B2* | 9/2008 | Loffler | B60R 22/405 |
| | | | 242/374 |
| 9,744,940 B1* | 8/2017 | Kohlndorfer | B60R 22/4628 |
| 10,029,647 B2* | 7/2018 | Gentner | B60R 22/34 |
| 2010/0176236 A1* | 7/2010 | Clute | B60R 22/3413 |
| | | | 242/394 |
| 2011/0215185 A1 | 9/2011 | Clute et al. | |
| 2013/0062450 A1* | 3/2013 | Fischer | B60R 22/4628 |
| | | | 242/374 |
| 2015/0336539 A1* | 11/2015 | Gray | B60R 22/4628 |
| | | | 242/389 |
| 2016/0229375 A1* | 8/2016 | Jabusch | B60R 22/3413 |

FOREIGN PATENT DOCUMENTS

| | | |
|---|---|---|
| EP | 0 755 340 B1 | 4/1995 |
| WO | WO 2014/048522 A1 | 4/2014 |

OTHER PUBLICATIONS

European Patent Office, P.B. 5818 Patentlaan 2, NL 2280, HV Rijswijk, International Search Report for International Application No. PCT/EP2015/072220, dated Dec. 10, 2015, 3 pages, Form PCT/ISA/210 (Jul. 2014).

* cited by examiner

BELT RETRACTOR WITH TWO-PART TENSIONING DRIVE WHEEL

CROSS REFERENCE TO RELATED APPLICATIONS

This application claims priority to German Patent Application No. 10 2014 114 140.7, filed on Sep. 29, 2014 and PCT/EP2015/072220, filed on Sep. 28, 2015.

FIELD OF THE INVENTION

The present invention relates to a motor vehicle seat belt retractor having a belt shaft having a shaft body, a profile head and a torsion bar. The torsion bar arranged in the shaft body is connected on one end to the shaft body and on a second end to the profile head, and the profile head can be securely grounded the to the vehicle. The belt retractor further having a belt pretensioner, wherein a pretensioner drive wheel of the belt pretensioner is directly connected in a rotationally fixed manner to the profile head of the belt shaft, and mass bodies can be engaged with the pretensioner drive wheel so as to transmit force to drive the belt shaft in a belt winding direction.

BACKGROUND

A belt retractor having the aforementioned features is known, for example, from DE 10 2008 059 386 B3, wherein a one-part pretensioner drive wheel is pushed onto the profile head and is secured thereon by use of a special bearing ring, onto which the shaft body is rolled in its movement relative to the blocked profile head. A multitude of parts are thus pushed onto the profile head during assembly.

Insofar as EP 0 755 340 B1 discloses a two-part configuration of the pretensioner drive wheel, it teaches the direct connection of the pretensioner drive wheel to the shaft body in order to wind the belt strap. The use of a force-limiting torsion bar and a profile head for vehicle-sensitive or belt-sensitive fixation of the shaft body on the side of the pretensioner drive wheel is not disclosed.

It is therefore an object of the present invention to solve the problem described with reference to the prior art and especially to disclose a belt retractor that is easy to assemble and has a small space requirement.

SUMMARY AND INTRODUCTORY DESCRIPTION OF INVENTION

The above-mentioned objects are attained by means of a belt retractor having the features was described herein.

These objects are attained with a belt retractor having the previously mentioned features, wherein the pretensioner drive wheel is configured in two parts by the profile head of the belt shaft and a push-on ring inserted onto the profile head and positively and non-positively connected thereto, wherein respectively mutually opposite dome-shaped partial receiving socket segments, which complement to form receiving sockets for the mass bodies, are formed on the profile head and on the push-on ring.

The present invention is thus related to a belt retractor, in which the profile head that is securely fixed to the vehicle when it is desired to lock the retractor and the pretensioner drive wheel are arranged on the same side of the shaft body, while a force-limiting torsion bar is additionally provided between the profile head and the shaft body. If the torsion bar thereby limits the force effect of the seatbelt acting on the occupant in the case of acceleration with the profile head securely grounded to the vehicle, then the belt pretensioner can wind up the belt webbing if needed by driving the belt shaft.

The present invention provides that the pretensioner drive wheel consists of two parts. The first part is the profile head of the belt shaft and the second part is the push-on ring. The profile head and the push-on ring have recesses and corresponding elevations for a positive-fitting fixation of the push-on ring on the profile head against a relative movement in the peripheral direction. In order to non-positively connect the profile head to the push-on ring, especially in axial direction, one end of the profile head can be especially caulked or crimped, so that the push-on ring can no longer be detached from the profile head without destroying it due to the plastic deformation of the profile head. In order to achieve the function of the single piece pretensioner drive wheel, the profile head and the push-on ring are provided with dome-shaped partial receiving socket segments, which respectively in pairs form receiving sockets for the mass bodies of the belt pretensioner.

The profile head provided with the push-on ring has a small space requirement because the dome-shaped partial receiving socket segments can be configured directly on the profile head. There is additionally no need for additional components for fixing the pretensioner drive on the profile head due to the positive and non-positive connection.

The teaching of the invention provides that the profile head of the belt shaft has an axially extending annular-shaped projection, which accommodates the torsion bar therein, and the push-on ring is fully inserted onto the annular-shaped projection, wherein at least one end area of the projection that extends above the inserted push-on ring is plastically deformed in order to non-positively connect to the inserted push-on ring. The projection serves thus, on the one hand, for a positive connection of the torsion bar to the profile head in the interior and, on the other hand, for the insertion of the push-on ring, wherein the end area is plastically deformed for locking of the push-on ring as well as also especially the torsion bar.

An axially projecting annular-shaped push-on sleeve, whose one frontal surface is in contact with the profile head, can additionally be configured on the push-on ring. Firstly, by means of the frontal contact, the position of the push-on sleeve is predetermined and thus the position of the push-on ring on the projection, and secondly, a circumferential gap can be configured between the partial receiving elements on the profile head on one side, and the partial receiving elements on the push-on ring on the other side.

In order to more accurately predetermine the position of the push-on ring and especially in order to make available a larger bearing surface of the push-on ring opposite the profile head, an annular-shaped slot can be configured on the profile head, and an axially extending, annular-shaped push-on sleeve formed on the push-on ring is inserted therein. The annular-shaped slot is positioned directly adjacent to the projection of the profile head and holds the push-on ring in the predetermined position, especially during crimping or caulking of the projection.

A particularly secure connection between the push-on ring and the profile head is achieved in this connection if the push-on sleeve has a length that is at least as great as a diameter of a receiving sockets for a mass body configured by use of two dome-shaped partial receiving socket segments, and the push-on sleeve makes contact with the projection in the interior over the entire length.

Another embodiment of the present invention provides that axially aligned grooves for accommodating corresponding axially positioned springs on the inside of the push-on ring are configured radially outward on the projection, and deformation elements are configured at the front end on the projection and flush with the grooves, which are plastically deformed for connecting the profile head to the push-on ring and the second end of the torsion bar. The deformation elements are plastically deformed radially inward, especially for connecting the push-on ring to the projection in the peripheral direction and for connecting the projection to the torsion bar.

According to another configuration of the belt retractor, a bearing ring for the shaft body is configured as one piece on the push-on ring on a side facing toward the shaft body, wherein the shaft body and the two-part pretensioner drive wheel axially overlap in the area of the bearing ring. This means firstly, that the assembly is simplified, and secondly, a small space requirement can be achieved because the bearing ring for the shaft body is also configured as one piece with the push-on ring.

BRIEF DESCRIPTION OF DRAWINGS

The invention as well as the technical environment will be described below with the aid of the figures, wherein it is emphasized that the figures depict a preferred embodiment of the invention, but that the latter is not limited thereto. The schematic figures show.

DETAILED DESCRIPTION

Figure 1:
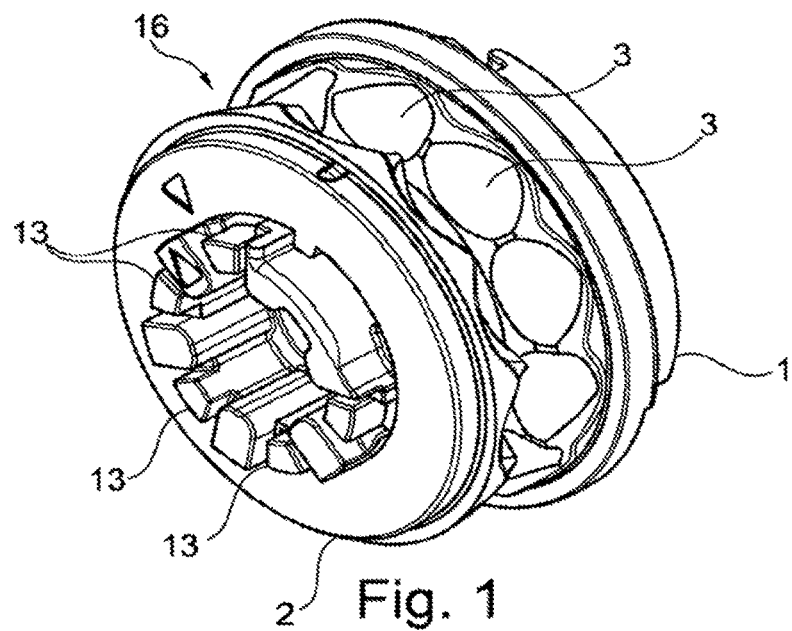
FIG. 1; is a perspective view of a profile head with a push-on ring pushed thereon, FIG. 2; is a sectional view through the profile head with the push-on ring pushed thereon, FIG. 3; is a perspective view of the profile head, FIG. 4; is a sectional view through the profile head.
Figure 2:
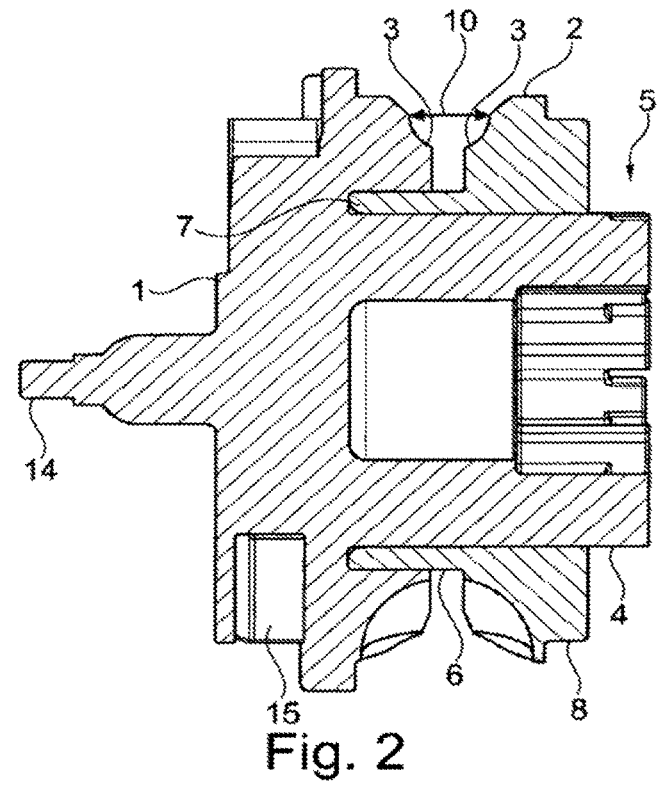
Figure 3:
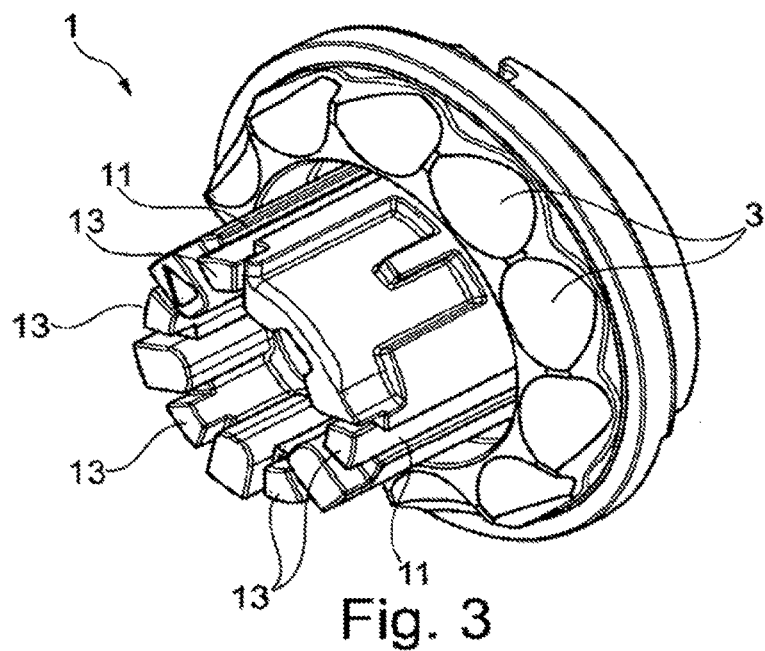
Figure 4:
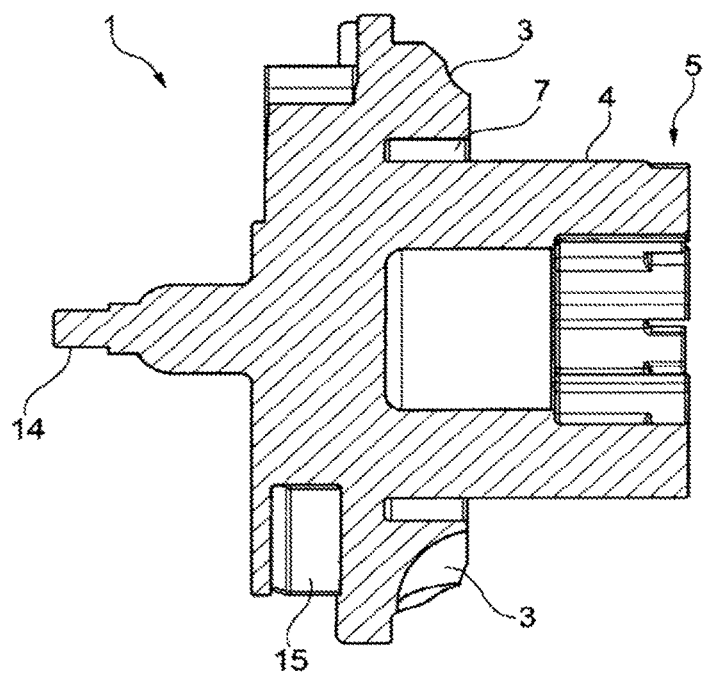

FIGS. 1 through 4 depict, among other things, a profile head 1 of a belt retractor having a stud or post 14 for mounting the profile head 1 on a housing of the belt retractor (not shown). A blocking latch receiving element 15 is configured in the profile head 1, and a belt webbing-sensitive and/or vehicle-sensitive controllable blocking latch can be arranged therein (i.e. webbing sensitive or vehicle sensitive retractor locking). The profile head 1 has an annular-shaped projection 4, in whose interior a torsion bar can be inserted and secured by one end on a side opposite to the stud 14 and the blocking latch receiving element 15. On its outer periphery, the projection 4 has axially positioned grooves 11, to which deformation elements 13 connect flush with the grooves 11 on the front side in an end area 5 of the projection 4. An annular-shaped slot 7 that extends around the projection 4 is configured at an end of the projection 4 opposite to the end area 5.

Figure 5:
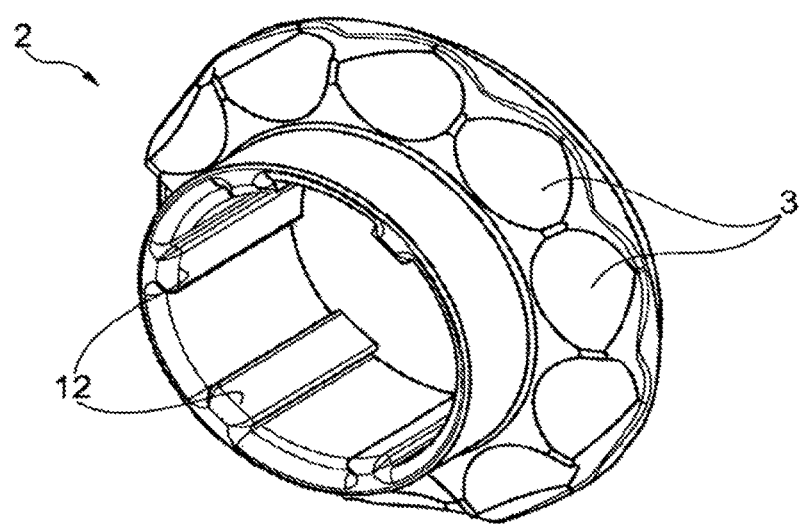
FIG. 5: is a perspective view of the push-on ring, and FIG. 6; is a sectional view through the push-on ring.
Figure 6:
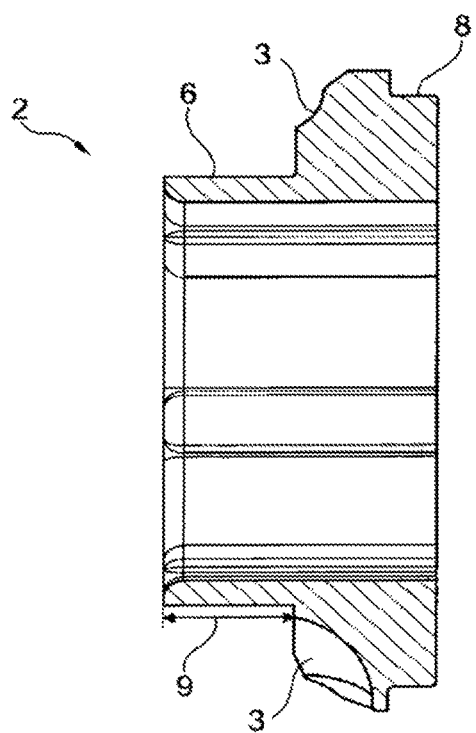

A push-on ring 2, which is also represented in FIGS. 5 and 6, is inserted onto the projection 4 of the profile head 1. The push-on ring 2 forms an axially projecting annular-shaped push-on sleeve 6. The push-on sleeve 6 has a length 9. The push-on ring 2 has on its inner side axially positioned springs 12, which correspond to the grooves 11 on the profile head 1. The push-on ring 2 has a bearing ring 8 configured as one piece and located on a side opposite to the push-on sleeve 6.

For assembly, the push-on ring 2 is pushed onto the projection 4 of the profile head 1, wherein the springs 12 engage in the grooves 11. The push-on ring 2 is inserted thereby with the push-on sleeve 6 into the annular-shaped slot 7 until the front side of the push-on sleeve 6 comes in contact with the profile head 1. The dome-shaped semi spherical socket segments 3 on the profile head 1 and on the push-on ring 6 form together, respectively in pairs, receiving sockets with a diameter 10 for mass bodies of a belt pretensioner in the inserted state. A pretensioner drive wheel 16 is thus configured in two parts by the profile head 1 and the push-on ring 2.

The deformation elements 13 are deformed in the peripheral direction by an applied force in order to non-positively fix the push-on ring 2 on the projection 4. In particular, a torsion bar, which is not depicted, can be inserted into the inside diameter of the projection 4 having spline type features before the application of force, wherein the deformation elements 13 are exposed to and deformed by a radially inward force, in addition to being exposed to a force in the peripheral direction, so that the torsion bar is non-positively locked in the projection 4 and connected to the profile head 1. The length 9 of the push-on sleeve 6 is greater than the diameter 10 of the receiving elements for the mass bodies formed by the partial receiving elements 3 in order to ensure the most secure connection possible between the push-on ring 2 and the profile head 1, and to make available a large bearing surface between the push-on ring 2 and the profile head 1.

When it is mounted on a belt retractor, the bearing ring 8 configured on the push-on ring 2 overlaps on the radially outward positioned shaft body, which is radially supported by the bearing ring 8, at least when under load.

While the above description constitutes the preferred embodiment of the present invention, it will be appreciated that the invention is susceptible to modification, variation and change without departing from the proper scope and fair meaning of the accompanying claims.

The invention claimed is:

1. A profile head and a pretensioner drive wheel for a belt retractor having a belt shaft, a shaft body and a torsion bar, wherein the torsion bar arranged in the shaft body is connected on one end to the shaft body and on a second end to the profile head, and the profile head is securely fixed with respect to the vehicle, and having a belt pretensioner configured to be driven by the pretensioner drive wheel, wherein the pretensioner drive wheel of the belt pretensioner is rotationally fixed relative to the profile head, and configured to be engaged by mass bodies so as to transmit force to drive the belt shaft in a seatbelt winding direction, wherein the pretensioner drive wheel is configured of two parts, composed of a portion of the profile head of the belt shaft and of a portion of a push-on ring that is pushed onto the profile head and is positively and non-positively connected thereto, wherein respectively mutually opposite dome-shaped partial receiving socket segments, which together form receiving sockets for the mass bodies, are formed as an annular-shaped slot in the profile head and as an annular-shaped push-on sleeve axially extending from the push-on ring, the push-on sleeve configured to be inserted into the annular-shaped slot.

2. The profile head and the pretensioner drive wheel according to claim 1, wherein the profile head of the belt shaft has an axially extending annular-shaped projection configured for receiving the torsion bar, and the push-on ring surrounds the annular-shaped projection, wherein at least one end area of the projection extending above the inserted-push-on ring is plastically deformed for non-positive connection with the inserted push-on ring.

3. The profile head and the pretensioner drive wheel according to claim 1, wherein the axially extending, annular-shaped push-on sleeve has one frontal surface making contact with the profile head.

4. The profile head and the pretensioner drive wheel according to claim 2, wherein the push-on sleeve has a length which is at least as great as a diameter of the receiving sockets for the mass bodies configured by means of two dome-shaped partial receiving socket segments, and the push-on sleeve makes contact with the projection in the interior over the entire length.

5. The profile head and the pretensioner drive wheel according to claim 2, further comprising axially aligned grooves configured radially outside on the projection for accommodating corresponding axially positioned springs on the inside of the push-on ring, and deformation elements are configured on the front face of the projection aligned with the grooves, which elements are plastically deformed to connect the profile head to the push-on ring and to the second end of the torsion bar.

6. The profile head and the pretensioner drive wheel according to claim 1, further comprising a bearing ring for the shaft body, configured as one piece on the push-on ring and positioned on a side facing the shaft body, wherein the shaft body and the pretensioner drive wheel axially overlap each other in the area of the bearing ring.

\* \* \* \* \*